United States Patent
Toda et al.

(10) Patent No.: US 12,145,274 B2
(45) Date of Patent: Nov. 19, 2024

(54) OPERATION PARAMETER ADJUSTING METHOD AND OPERATION PARAMETER ADJUSTING DEVICE FOR ADJUSTING OPERATION PARAMETERS OF ROBOT

(71) Applicant: SEIKO EPSON CORPORATION, Tokyo (JP)

(72) Inventors: Jun Toda, Shiojiri (JP); Kimitake Mizobe, Nagaokakyo (JP); Ryutaro Seki, Shiojiri (JP); Takahisa Fukusen, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 288 days.

(21) Appl. No.: 17/855,896

(22) Filed: Jul. 1, 2022

(65) Prior Publication Data

US 2023/0001574 A1 Jan. 5, 2023

(30) Foreign Application Priority Data

Jul. 2, 2021 (JP) .................. 2021-110803

(51) Int. Cl.
 *B25J 9/16* (2006.01)
(52) U.S. Cl.
 CPC ............. *B25J 9/163* (2013.01); *B25J 9/1633* (2013.01); *B25J 9/1651* (2013.01)
(58) Field of Classification Search
 CPC ........ B25J 9/163; B25J 9/1633; B25J 9/1651; B25J 9/1653; G05B 2219/37435; G05B 2219/40586
 See application file for complete search history.

(56) References Cited

U.S. PATENT DOCUMENTS

| | | | |
|---|---|---|---|
| 11,850,751 B2 * | 12/2023 | Matsuda | ............... B25J 9/1633 |
| 2008/0140257 A1 * | 6/2008 | Sato | ...................... B25J 9/1633 901/30 |

(Continued)

FOREIGN PATENT DOCUMENTS

| | | |
|---|---|---|
| JP | 2018-200539 A | 12/2018 |
| WO | 2018216490 A1 | 11/2018 |
| WO | 2019/234837 A1 | 12/2019 |

*Primary Examiner* — Kira Nguyen
(74) *Attorney, Agent, or Firm* — Harness, Dickey & Pierce, P.L.C.

(57) ABSTRACT

An operation parameter adjusting method according to an aspect includes a detecting step for causing a robot to execute a plurality of adjustment operations using candidate values of operation parameters and acquiring detection values of a detecting section, an operation parameter updating step for executing optimization processing for the operation parameters using the acquired detection values to thereby obtain new candidate values of the operation parameters, a repeating step for repeating the operation parameter updating step and the detecting step, and an operation parameter determining step for determining, based on one or more candidate values of the operation parameters obtained by the repeating step, the operation parameter used in the robot system. The detecting step includes a suspension determining step for performing continuation or suspension of the detecting step based on a result of comparison of the acquired detection values of the part of the adjustment operations and a reference value.

10 Claims, 11 Drawing Sheets

(56) References Cited

U.S. PATENT DOCUMENTS

| | | | |
|---|---|---|---|
| 2008/0312769 A1* | 12/2008 | Sato | B25J 9/1687 |
| | | | 901/31 |
| 2019/0358824 A1* | 11/2019 | Takeuchi | B25J 9/161 |
| 2021/0073438 A1 | 3/2021 | Akiyama | |
| 2021/0121255 A1* | 4/2021 | Phillips | A61B 34/76 |

* cited by examiner

BEFORE MEASUREMENT OF FIRST EVALUATION MOTION

AFTER MEASUREMENT OF FIRST EVALUATION MOTION

FIG. 14

|  | OBJECTIVE FUNCTION | CONSTRAINT FUNCTION |
|---|---|---|
| MAXIMUM OR MINIMUM | A | B |
| AVERAGE | C | D |

FIG. 15

|  | OBJECTIVE FUNCTION | CONSTRAINT FUNCTION |
|---|---|---|
| MAXIMUM OR MINIMUM | $\mu$ AND $\sigma$ CONSIDERED IMPORTANT | $\mu$ AND $\sigma$ CONSIDERED IMPORTANT |
| AVERAGE | $\sigma$ CONSIDERED IMPORTANT | $\sigma$ CONSIDERED IMPORTANT |

FIG. 16

|  | OBJECTIVE FUNCTION | CONSTRAINT FUNCTION |
|---|---|---|
| MAXIMUM OR MINIMUM | BEST VALUE IN PAST | CONSTRAINT THRESHOLD |
| AVERAGE | BEST VALUE IN PAST | CONSTRAINT THRESHOLD |

OPERATION PARAMETER ADJUSTING METHOD AND OPERATION PARAMETER ADJUSTING DEVICE FOR ADJUSTING OPERATION PARAMETERS OF ROBOT

The present application is based on, and claims priority from JP Application Serial Number 2021-110803, filed Jul. 2, 2021, the disclosure of which is hereby incorporated by reference herein in its entirety.

BACKGROUND

1. Technical Field

The present disclosure relates to an operation parameter adjusting method and an operation parameter adjusting device for adjusting operation parameters of a robot.

2. Related Art

There has been a technique for automatically learning operation control for equipment. In JP-A-2018-200539 (Patent Literature 1), a task is divided into a plurality of scenes and partial operations performed in the scenes are specified based on a result of a learning content analysis performed in a learning initial stage. An operation allowable range is learned for each of the partial operations. Thereafter, the partial operations classified and learned for each of the scenes are combined and, then, learning for optimally performing a start to an end of an operation is performed. Since the operation allowable range is learned in advance, thereafter, it is possible to perform learning while avoiding performing an operation deviating from allowance requirements. As a result, it is possible to efficiently perform learning.

However, in the technique of Patent Literature 1, all of predetermined operations are performed in the learning of the operation allowable range. All of operations in the operation allowable range are performed in the learning from the start to the end of the operation as well. Accordingly, a lot of time is still required for the learning.

SUMMARY

According to an aspect of the present disclosure, there is provided an operation parameter adjusting method for adjusting operation parameters of a robot system including a robot and a detecting section configured to detect vibration of the robot. The operation parameter adjusting method includes: a detecting step for causing the robot to execute a plurality of adjustment operations using candidate values of the operation parameters and acquiring detection values of the detecting section; an operation parameter updating step for executing optimization processing for the operation parameters using the acquired detection values to thereby obtain new candidate values of the operation parameters; a repeating step for repeating the operation parameter updating step and the detecting step performed using the new candidate values obtained in the operation parameter updating step; and an operation parameter determining step for determining, based on one or more candidate values of the operation parameters obtained by the repeating step, the operation parameter used in the robot system. The detecting step includes a suspension determining step for, in a state in which the detection values are acquired for a part of the plurality of adjustment operations, performing continuation or suspension of the detecting step based on a result of comparison of the acquired detection values of the part of the adjustment operations and a reference value.

BRIEF DESCRIPTION OF THE DRAWINGS

FIG. 14 is a table showing an example of indicators at the time when execution order of evaluation motions is determined in processing in S800 in FIG. 4.

FIG. 15 is a table showing indicators that should be considered important when the execution order of the evaluation motions is determined in the processing in S800 in FIG. 4 in four modes shown in FIG. 14.

FIG. 16 is a table showing references of comparison with the indicators in the four modes shown in FIG. 4.

DESCRIPTION OF EXEMPLARY EMBODIMENTS

A. First Embodiment

A1. Configuration of a Robot System

Figure 1:
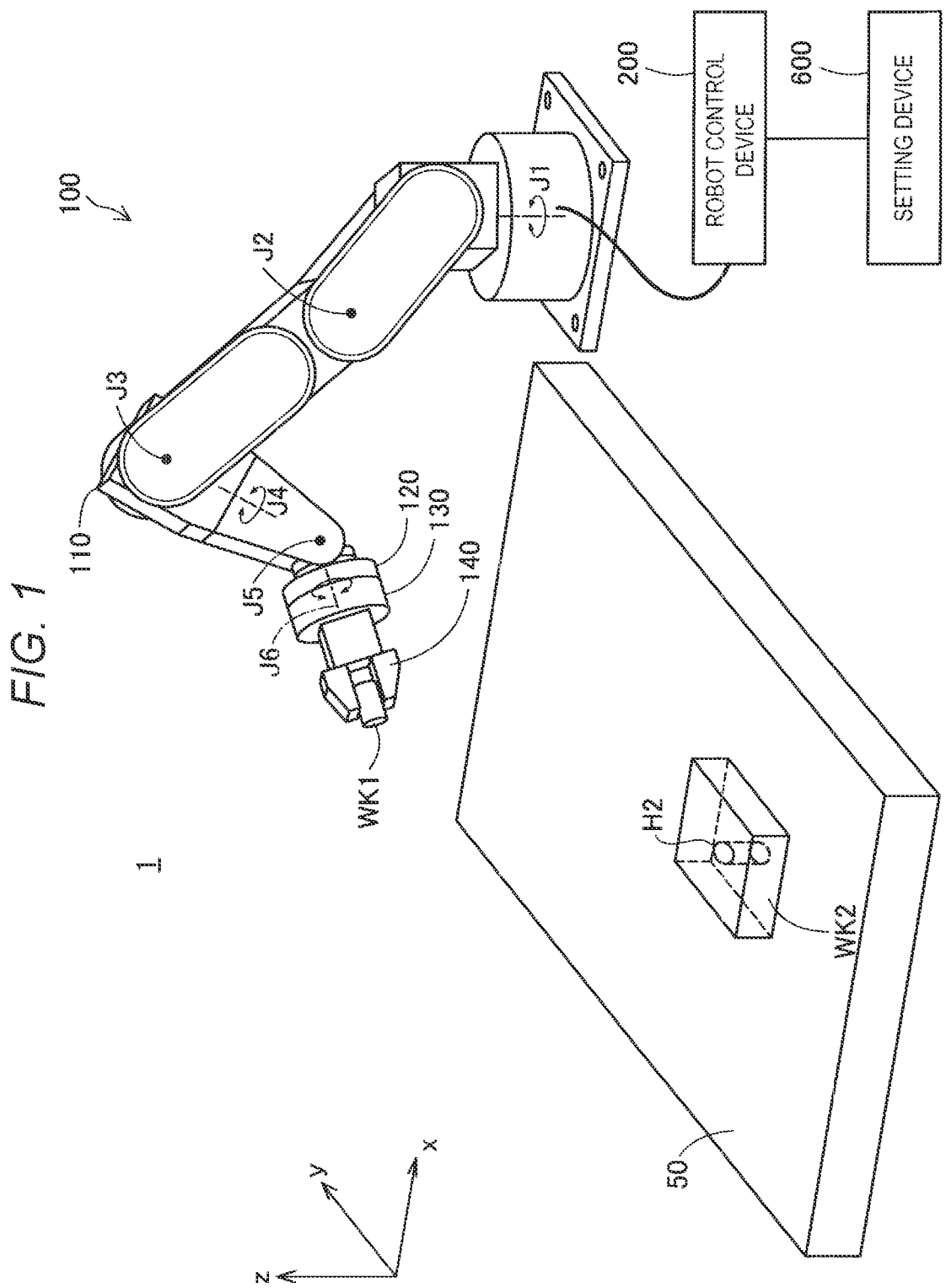
FIG. 1 is a perspective view showing a robot system in an embodiment.

FIG. 1 is a perspective view showing a robot system 1 in an embodiment. The robot system 1 includes a robot 100, a force detector 130, an end effector 140, a robot control device 200, and a setting device 600. The robot 100, the robot control device 200, and the setting device 600 are communicably connected via a cable or wireless communication.

The robot 100 is a single-arm robot used with various end effectors attached to an arm flange 120 present at the distal end of an arm 110 (see an upper right part of FIG. 1).

The arm 110 includes six joints J1 to J6. The joint J2, J3, and J5 are bending joints and the joints J1, J4, and J6 are torsion joints. Servomotors and position sensors are provided in the joints. The servomotors generate rotation outputs for driving the joints. A position sensor 160 detects angle positions of output shafts of the servomotors. To facilitate understanding of a technique, in FIG. 1, the servomotors and the position sensor 160 are not shown.

Various end effectors for performing work such as gripping and machining for target objects are attached to the arm flange 120 present at the distal end of the joint J6. In this specification, a target object treated by the robot 100 is referred to as "workpiece" as well.

A position near the distal end of the arm 110 can be set as a tool center point. In the following explanation, the tool center point is referred to as "TCP". The TCP is a position used as a reference of the position of the end effector 140. For example, a predetermined position on a rotation axis of the joint J6 can be set as the TCP.

The robot 100 can arrange an end effector in any position and any posture within a movable range of the arm 110. The force detector 130 and the end effector 140 are set in the arm flange 120. The end effector 140 is a gripper in this embodiment.

The force detector 130 is provided in the robot 100 and can measure an external force applied to the robot 100. The force detector 130 is specifically a six-axis sensor. The force detector 130 can detect the magnitudes of forces parallel to an x axis, a y axis, and a z axis orthogonal to one another in a sensor coordinate system, which is a specific coordinate system, and the magnitudes of torques around the three axes.

A coordinate system defining a space in which the robot 100 is set is referred to as "robot coordinate system". The robot coordinate system is a three-dimensional orthogonal coordinate system defined by an x axis and a y axis orthogonal to each other on the horizontal plane and a z axis having a positive direction in the vertical upward direction. A coordinate system shown in FIG. 1 is the robot coordinate system. A rotation angle around the x axis is represented by Rx, a rotation angle around the y axis is represented by Ry, and a rotation angle around the z axis is represented by Rz. Any position in a three-dimensional space can be represented by positions in the x, y, and z axis directions. Any posture in the three-dimensional space can be represented by rotation angles in the x, y, and z axis directions. The description "position" in this specification can mean a position and a posture as well. The description "force" in this specification can mean force and torque.

A workpiece WK2, which is one of work targets of the robot 100, is disposed on a workbench 50. A fitting hole H2 is formed on the upper surface of the workpiece WK2. The fitting hole H2 is a hole having a circular cross section, extending in a z-axis negative direction from an opening of the upper surface of the workpiece WK2, and having a bottom.

The end effector 140 is provided in the robot 100 and can hold a workpiece WK1. The workpiece WK1 is a columnar component. The outer diameter of the workpiece WK1 is slightly smaller than the inner diameter of the fitting hole H2. The end effector 140 can perform work for fitting the workpiece WK1 gripped by the end effector 140 in the fitting hole H2 of the workpiece WK2.

The robot control device 200 controls the arm 110 and the end effector 140 (see a lower right part of FIG. 1). The robot control device 200 includes a processor 210 and a memory 220. The memory 220 includes a volatile memory and a nonvolatile memory. The processor 210 realizes various functions by executing programs stored in advance in the memory 220.

The robot control device 200 can cause the robot 100 to execute a tracer operation. The tracer operation is generally an operation for following an external force. In the tracer operation, the robot control device 200 performs force control for the robot 100 based on a measurement value of the external force by the force detector 130. Functions of the robot control device 200 are realized by a computer including a processor and a memory executing a computer program.

The setting device 600 receives an instruction from a teacher and generates a control program (see the lower right part of FIG. 1). The setting device 600 adjusts force control parameters used in force control. The control program generated by the setting device 600 and force control parameters 226 are transferred to the robot control device 200 and stored in the memory 220 of the robot control device 200.

Figure 2:
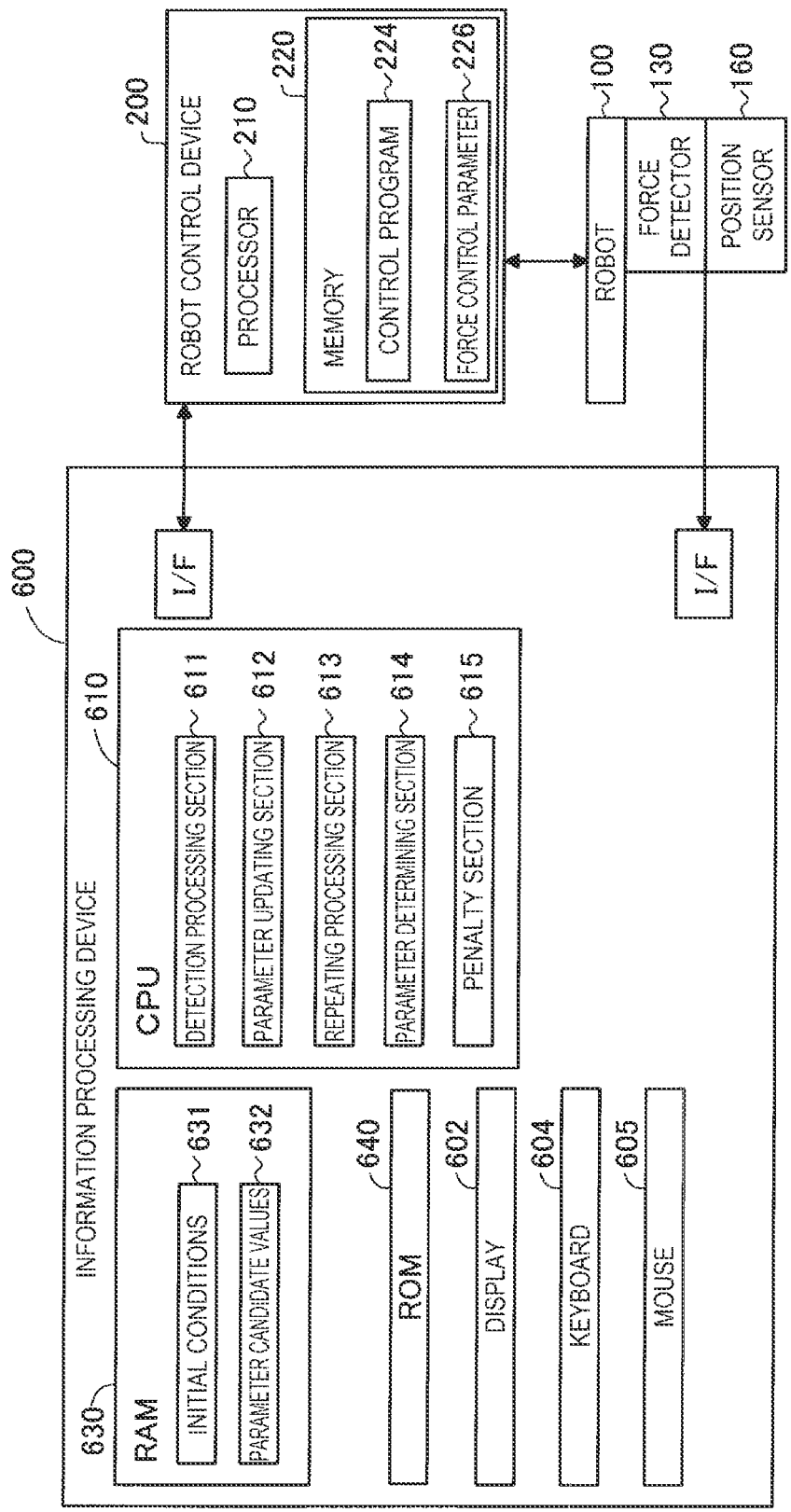
FIG. 2 is a block diagram showing the configuration of a setting device.

FIG. 2 is a block diagram showing the configuration of the setting device 600. The setting device 600 generates an operation program for specifying the operation of the robot 100. The setting device 600 is a computer including a display 602 functioning as an output device and a keyboard 604 and a mouse 605 functioning as input devices. The setting device 600 further includes a processor 610, which is a CPU (Central Processing Unit), a RAM 630, and a ROM 640. The processor 610 loads a computer program stored in a storage medium to the RAM 630 and executes the computer program to thereby realize various functions including adjustment of force control parameters. The setting device 600 is connected to the force detector 130 of the robot 100 and the robot control device 200 via an interface.

Figure 3:
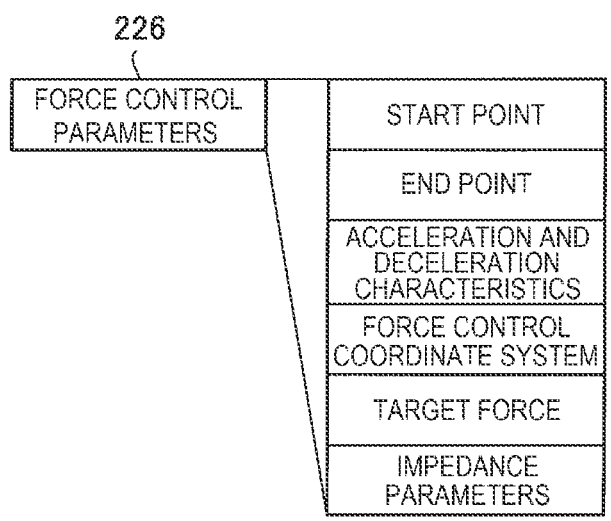
FIG. 3 is a diagram showing force control parameters used in a control program of a robot.

FIG. 3 is a diagram showing the force control parameters 226 used in a control program for the robot 100. The force control parameters 226 are parameters concerning force control for the robot 100. The force control parameters 226 are used in force control performed according to a control program 224.

The force control parameters 226 include parameters indicating a "start point" and an "end point" in operations (see an upper part of FIG. 3). In this embodiment, a "start point" and an "end point" of control points of the robot 100, which is a control target, are defined by the robot coordinate system. Translational positions and rotational positions for the axes of the robot coordinate system are defined. The start point and the end point may be defined by various coordinate systems. In force control, at least one of the start point and the end point is sometimes not defined in one operation.

The force control parameters 226 include "acceleration and deceleration characteristics" of the TCP in a plurality of operations (see a middle part of FIG. 3). When the TCP of the robot 100 moves from start points to end points of the operations, speeds of the TCP at respective times are specified by the acceleration and deceleration characteristics. In this embodiment, speed described by the acceleration and deceleration characteristics is speed about the TCP of the control target robot 100. In this embodiment, the speed of the TCP is defined by the robot coordinate system. That is, translational speeds and rotational speeds, that is, angular velocities are defined about the axes of the robot coordinate system. The acceleration and deceleration characteristics may also be defined by various coordinate systems.

The force control parameters 226 include, as a parameter, information for specifying a coordinate system in which a point on which a target force of force control acts is set as an origin and one axis is directed in the direction of the target force, that is, a force control coordinate system (see the middle part of FIG. 3). The parameter can be variously defined. For example, the parameter for specifying the force control coordinate system can be defined by data indicating a relation between the force control coordinate system and other coordinate systems (a robot coordinate system and the like).

The force control parameters 226 include a "target force" (see a lower part of FIG. 3). The target force is a force taught as a force that should act on any point in various kinds of work and is defined by the force control coordinate system. A target force vector indicating the target force is defined as a start point of the target force vector and six axis components from the start point, that is, translational forces of three axes and torques of three axes and is represented by the force control coordinate system. If the relation between the force control coordinate system and the other coordinate systems is used, the target force can be converted into a vector in any coordinate system, for example, the robot coordinate system.

The force control parameters 226 include "impedance parameters" (see the lower part of FIG. 3). Impedance control is control for realizing virtual mechanical impedance with driving forces of motors that drives the joints. In the impedance control, mass that the TCP virtually has is defined as a virtual mass coefficient m. Viscous resistance that the TCP virtually receives is defined as a virtual viscous coefficient d. A spring constant of an elastic force that the TCP virtually receives is defined as a virtual modulus of elasticity k. The impedance parameters are these coefficients m, d, and k. The impedance parameters are defined about translation and rotation with respect to the axes of the robot coordinate system.

A2. Creation of a Control Program and Adjustment of Parameters

Figure 4:
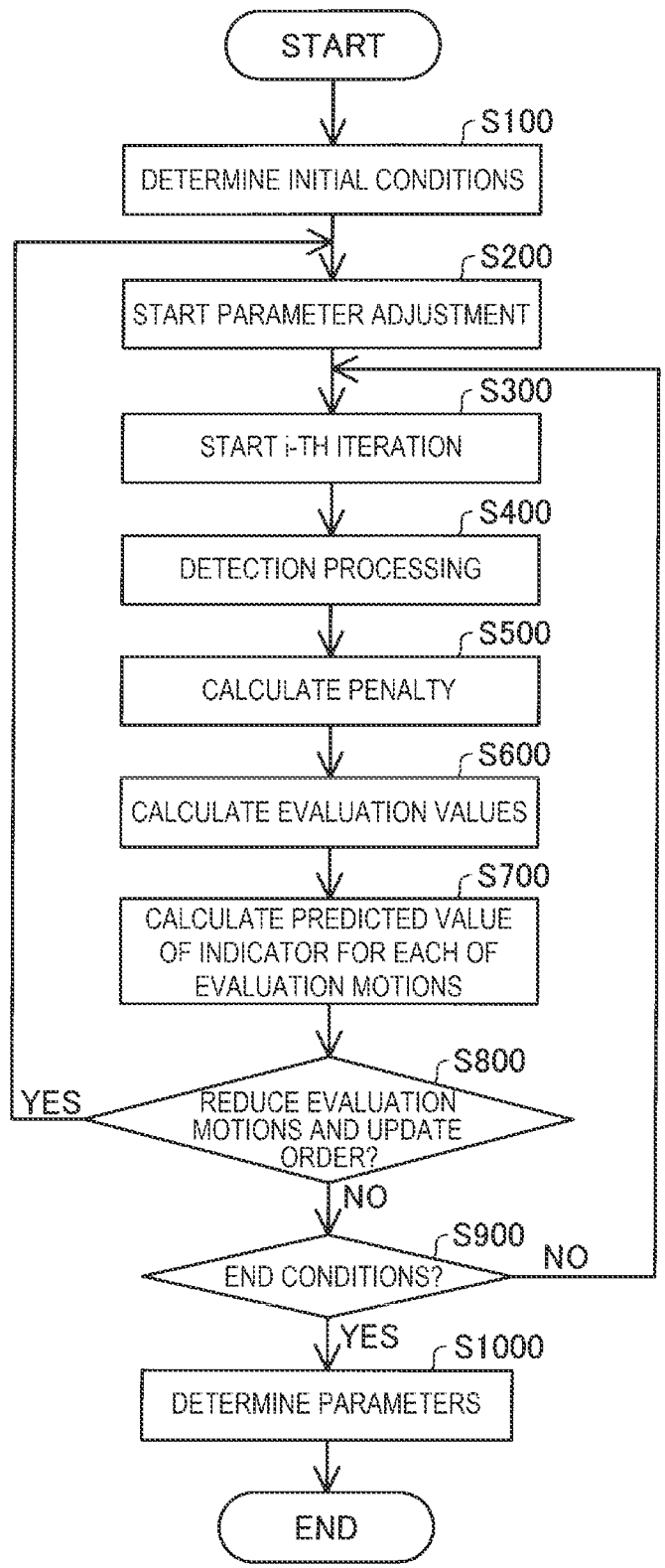
FIG. 4 is a flowchart showing an adjusting method for the force control parameters.

FIG. 4 is a flowchart showing an adjusting method for the force control parameters. An operation parameter adjusting method for adjusting the force control parameters 226 of the robot system 1 is realized by processing shown in FIG. 4. The processing shown in FIG. 4 is executed by the processor 610 of the setting device 600.

In step S100, the processor 610 of the setting device 600 determines initial conditions in adjustment of the force control parameters. More specifically, the processor 610 determines initial candidate values of the force control parameters, N (N is an integer equal to or larger than 2) evaluation motions used in evaluation of the force control parameters, order of the N evaluation motions executed in step S400, and search conditions. Determined initial conditions 631 are stored in the RAM 630.

The search conditions include the following.
(i) Objective Function

The objective function is a function for calculating an evaluation value of a force control parameter. In this embodiment, the objective function is average operation speed of a control point in each evaluation motion. The average operation speed is a value obtained by dividing a moving distance of the control point in the evaluation motion by an operation time. In this specification, the average operation speed is referred to as "operation speed" as well.
(ii) Constraint Function The constraint function is a function for specifying a condition that a force control parameter should satisfy. In a search for the force control parameter, a constraint threshold is set as a constraint condition with respect to a value obtained by the constraint function. In this embodiment, the constraint function is a maximum value of overshoots in the evaluation motions. The "overshoot" is an excessive amount of a control amount with respect to a target value. In this embodiment, the overshoot indicates an amount of a detection value of the force detector 130 exceeding a target force of the force control parameter.
(iii) Search Range for a Force Control Parameter The search range is a range of a force control parameter that can be examined in adjustment of the force control parameter.
(iv) Suspension Threshold for Determining Suspension of Processing About a force control parameter being evaluated, when a possibility that a preferable evaluation value is obtained is low, examination about the force control parameter is suspended. The suspension threshold is a threshold for determining the suspension. The suspension threshold is used in processing in step S440 explained below.

In step S200 in FIG. 4, the processor 610 of the setting device 600 starts adjustment of the force control parameters.

In step S300, the processor 610 of the setting device 600 starts i-th iteration, that is, i-th processing in processing in S300 to S700 repeated a plurality of times; i is an integer from 1 to Ifin. Ifin is an integer equal to or larger than 2. Candidate values of a set of force control parameters are evaluated in one iteration.

In step S300, candidate values of a set of force control parameters, which are evaluation targets, are determined. In the processing shown in FIG. 4, in step S300 executed first, initial candidate values of the force control parameters stored in the ROM 640 of the setting device 600 in advance are determined as evaluation targets.

In the processing shown in FIG. 4, in step S300 executed second and subsequent times, optimization processing for the force control parameters is executed using detection values acquired in immediately preceding step S400, whereby new candidate values of the force control parameters are acquired. An optimization algorithm used in this embodiment is specifically a covariance matrix adaptation evolution strategy (CMA-ES). Acquired candidate values 632 of the force control parameters are stored in the RAM 630. The processing in step S300 is referred to as "operation parameter update processing" as well. A functional section of the processor 610 of the setting device 600 that executes the processing in step S300 is shown in FIG. 2 as a "parameter updating section 612".

In step S400 in FIG. 4, the processor 610 of the setting device 600 performs detection processing. A process of step S400 executed second and subsequent times is executed based on influence degrees calculated in later step S700.

In the detection processing, the N evaluation motions determined in step S100 are executed about candidate values of a set of force control parameters, which are evaluation targets, and detection values such as overshoots and operation times are detected. However, in step S400, in some case, a part of the N evaluation motions is executed and another part of the N evaluation motions is not executed. About a candidate value of the force control parameter 226, a detection value of which acquired during the detection processing in step S400 is found as exceeding a certain degree and unpreferable, thereafter, execution of the evaluation motion and detection of an operation time and the like are sometimes not performed. The detection processing executed in step S400 is explained in detail below.

The processing in step S400 is referred to as "detection processing". A functional section of the processor 610 of the setting device 600 that executes the processing in step S400 is shown in FIG. 2 as a "detection processing section 611".

In step S500 in FIG. 4, the processor 610 of the setting device 600 calculates a penalty about the candidate values of the set of force control parameters, which are the evaluation targets. In this embodiment, the penalty is an amount acting to deteriorate evaluation of the candidate values of the force control parameters when evaluation values for the candidate values of the force control parameters are determined. The penalty is calculated by multiplying the number of unexecuted evaluation motions among the N evaluation motions by a predetermined coefficient in the detection processing in step S400.

In step S600, the processor 610 of the setting device 600 calculates evaluation values about the candidate values of the set of force control parameters, which are the evaluation targets, using a value of the objective function and the penalty. In this embodiment, the objective function is average operation speed. In this embodiment, the evaluation value is calculated as follows.

[Evaluation value]=[average operation speed]−[penalty]

As a result of the processing explained above, the penalty is given to the evaluation values of the candidate values of the operation parameters for which the suspension of the detection processing is performed in step S400. By performing such processing, a candidate value of the force control parameter 226, a detection value of which acquired in the detection processing in step S400 is found as exceeding a certain degree and unpreferable, can be less easily determined as the force control parameter 226 used in the robot system in operation parameter determination processing performed later based on the evaluation value.

The processing in step S500 and S600 is referred to as "penalty processing" as well. A functional section of the processor 610 of the setting device 600 that executes the processing in steps S500 and S600 is shown in FIG. 2 as a "penalty section 615".

In step S700 in FIG. 4, the processor 610 of the setting device 600 calculates, about one or more evaluation motions, which are evaluation targets, predicted values of indicators used for acceleration of detection processing. The indicators are calculated based on the detection values obtained by the detection processing in step S400. The predicted values of the indicators are used as influence degrees in selection of an evaluation motion and determination of execution order in later step S800.

In this embodiment, specifically, the predicted values of the indicators are predicted values of overshoots in the evaluation motions. In step S700, predicted values of overshoots are calculated about a plurality of evaluation motions based on values of the overshoots obtained in the detection processing in step S400 up to that time. The processing executed in step S700 is explained in detail below.

In step S800, the processor 610 of the setting device 600 performs processing explained below based on the influence degrees calculated in step S700 and an input from an operator. That is, the processor 610 determines an evaluation motion not to be executed in the detection processing in step S400 to be performed next among a plurality of evaluation motions executed in the detection processing in immediately preceding step S400. The processor 610 of the setting device 600 determines order of a plurality of evaluation motions to be executed in the detection processing in step S400 to be performed next. The processing executed in step S800 is explained in detail below.

When an evaluation motion not to be executed in the detection processing in step S400 to be performed next is not determined anew in the processing explained above, the processing proceeds to step S900.

When an evaluation motion not to be executed in the detection processing in step S400 to be performed next is determined anew in the processing explained above, the processing returns to step S200. In that case, a penalty, evaluation values, and predicted values not taking into account a detection value of the evaluation motion not to be executed are recalculated about the candidate values of the force control parameters for which the penalty, the evaluation values, and the predicted values were calculated in steps S500 to S700 in the processing performed up to that time. Thereafter, the processing returns to step S200. In the optimization processing in step S300 executed thereafter, a search is resumed from a promising region searched in the last processing in step S300.

In step S900, the processor 610 of the setting device 600 determines whether an end condition has been satisfied. The end condition is that any one of the following is satisfied.

(i) The processing in steps S300 to S800 was executed Ifin times.
 (ii) An amount of improvement from the evaluation values in step S600 executed immediately before the evaluation values obtained in step S600 was continuously smaller than a predetermined improvement threshold for more than a predetermined number of times threshold.
 (iii) A predetermined threshold time has elapsed from the start of the processing in FIG. 4.

When the end condition is not satisfied in step S900, the processing returns to step S300. When the end condition is satisfied in step S900, the processing proceeds to step S1000.

According to the processing in step S800 and step S900, the operation parameter update processing in step S300 and the detection processing in step S400 performed using the new candidate values obtained in the operation parameter update processing are repeated. Processing in which the operation parameter update processing in step S300 and the detection processing in step S400 performed using the new candidate values obtained in the operation parameter update processing are repeated is referred to as "repeating processing" as well. In the repeating processing, the influence degree determination processing in step S700 is also repeatedly executed together with the operation parameter update processing and the detection processing. A functional section of the processor 610 of the setting device 600 that executes the repeating processing is shown in FIG. 2 as a "repeating processing section 613".

In step S1000 in FIG. 4, the processor 610 of the setting device 600 determines, based on the one or more candidate values 632 of the force control parameters obtained by the repetition of steps S200 to S900, a force control parameter used in the robot system. More specifically, the force control parameter used in the robot system is determined based on a value of an objective function serving as an evaluation value of each of one or more candidate values of the force control parameters. Still more specifically, a candidate value of a force control parameter having the best value of an objective function serving as an evaluation value among candidate values of force control parameters obtained up to that time is determined as the force control parameter used in the robot system. A candidate of a force control parameter for which the detection processing is not suspended in step S400 and average operation speed, which is an objective function, is the highest is determined as the force control parameter used in the robot system.

The determined force control parameter 226 is transmitted from the setting device 600 to the robot control device 200 and stored in the memory 220 of the robot control device 200. The processing in step S1000 is referred to as "operation parameter determination processing" as well. A functional section of the processor 610 of the setting device 600 that executes the processing in step S1000 is shown in FIG. 2 as a "parameter determining section 614".

Figure 5:
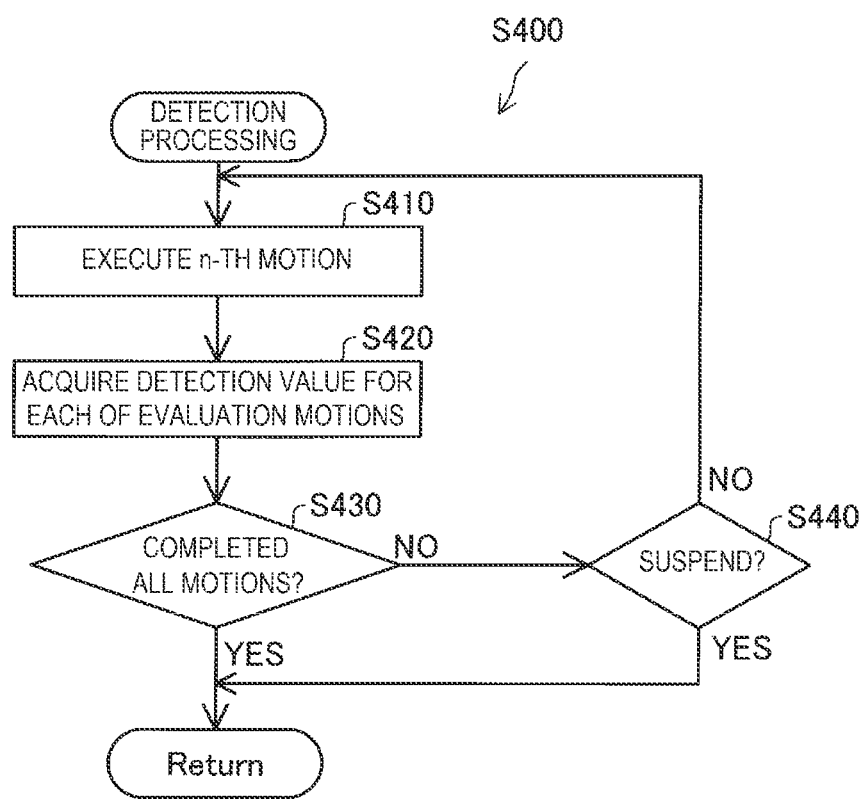
FIG. 5 is a flowchart showing processing in step S400 in FIG. 4.

FIG. 5 is a flowchart illustrating the detection processing in step S400 in FIG. 4. In step S410, the processor 610 of the setting device 600 causes the robot 100 to execute an n-th evaluation motion using the candidate values of the force control parameters determined in step S300 in FIG. 4; n is an integer from 1 to M. M is an integer equal to or smaller than N. When step S400 is executed first in the processing in FIG. 4, M=N. In step S400, step S410 is repeatedly executed, whereby the robot 100 executes M evaluation motions using the candidate values of the force control parameters determined in step S300 in FIG. 4.

The M evaluation motions executed in step S410 repeated in step S400 are decided in step S800 in FIG. 4. The order of the M evaluation motions executed in step S410 is also decided in step S800 in FIG. 4. In step S400 executed first in the processing in FIG. 4, the N evaluation motions are executed in step S410 in predetermined order.

In step S420 in FIG. 5, the processor 610 of the setting device 600 acquires detection values of the position sensor 160 and the force detector 130 obtained during the execution of the evaluation motions. As a result, operation times of the evaluation motions and values of overshoots are obtained. The processing in step S420 is performed substantially in parallel to the processing in step S410.

In step S430, the processor 610 of the setting device 600 determines whether the processing in steps S410 and S420 was executed about all of the evaluation motions decided in immediately preceding step S800. When the processing in steps S410 and S420 was executed about all of the evaluation motions, the processing in FIG. 5 ends. When the processing in steps S410 and S420 is not completed about all of the evaluation motions, the processing proceeds to step S440. That is, the processing in step S440 is performed in a state in which detection values have been acquired about a part of the plurality of evaluation motions.

In step S440, the processor 610 of the setting device 600 determines continuation or suspension of the processing in FIG. 5 based on a result of comparison of the acquired detection values of the evaluation motions and the suspension threshold. More specifically, when a maximum value of the overshoots acquired in step S420 exceeds a predetermined constraint threshold, the processing in FIG. 5 is ended. When the maximum value of the overshoots acquired in step S420 does not exceed the constraint threshold, the processing returns to step S410. In step S410, the processor 610 of the setting device 600 executes the next evaluation motion according to the order decided in step S800 in FIG. 4. The processing in step S800 is explained later.

By performing such processing, a part of the plurality of evaluation motions is not executed about a candidate value of a force control parameter, a value of an overshoot of which acquired during the detection processing is found as exceeding the constraint threshold, in the adjustment of the force control parameters 226 of the robot system. As a result, compared with an aspect in which all of the evaluation motions are executed about the candidate values of the respective force control parameters, a time required for the adjustment of the force control parameters 226 of the robot system is reduced. The processing in step S440 is referred to as "suspension determination processing" as well.

In step S700 in FIG. 4, the processor 610 of the setting device 600 calculates predicted values of overshoots about the plurality of evaluation motions based on the values of the overshoots obtained in the detection processing in step S400 up to that time. In a state in which the I-th iteration is completed, a predicted value $c_{os}(n)$ of an overshoot of an n-th evaluation motion is calculated as follows.

When OS(i, n) is assumed to be an overshoot of the n-th evaluation motion of the i-th iteration, an average value $\mu_{os}(n)$ of overshoots of the n-th evaluation motion up to the I-th iteration is obtained by Expression (1).

[Math. 1]
$$\mu_{OS}(n) = \frac{1}{I}\sum_{i=1}^{I} OS(i, n). \tag{1}$$

A standard deviation $\sigma_{os}(n)$ of the overshoots of the n-th evaluation motion up to the I-th iteration is obtained by Expression (2).

[Math. 2]
$$\sigma_{OS}(n) = \sqrt{\frac{1}{I}\sum_{i=1}^{I} (OS(i, n) - \mu_{OS}(n))^2}. \tag{2}$$

As a result, in a state in which the I-th iteration is completed, a predicted value $c_{os}(n)$ of an overshoot of the n-th evaluation motion can be calculated by the following Expression (3).

[Math. 3]
$$c_{os}(n)=\mu_{os}(n) \pm k\sigma_{os}(n) \tag{3}$$

k is a positive coefficient n is 1 to N

However, in this embodiment, $c_{os}(n)$ is a predicted value of an overshoot and is a value, the smaller it is, the higher the evaluation. Accordingly, in the state in which the I-th iteration is completed, the predicted value $c_{os}(n)$ of the overshoot of the n-th evaluation motion is calculated by the following Expression (4).

[Math. 4]
$$c_{os}(n)=\mu_{os}(n)+k\sigma_{os}(n) \tag{4}$$

k is a positive coefficient n is 1 to N

When $c_{os}(n)$ is a value, the larger it is, the higher the evaluation, in the state in which the I-th iteration is completed, the predicted value $c_{os}(n)$ of the overshoot of the n-th evaluation motion is calculated by the following Expression (5).

[Math. 5]
$$c_{os}(n)=\mu_{os}(n)-k\sigma_{os}(n) \tag{5}$$

k is a positive coefficient n is 1 to N

When iteration in which an overshoot is not detected about an evaluation motion for which the overshoot is detected in the other iterations is included in the first to I-th iterations, the iteration is excluded from targets in the calculation of the right sides of Expressions (1) to (3) described above.

Figure 6:
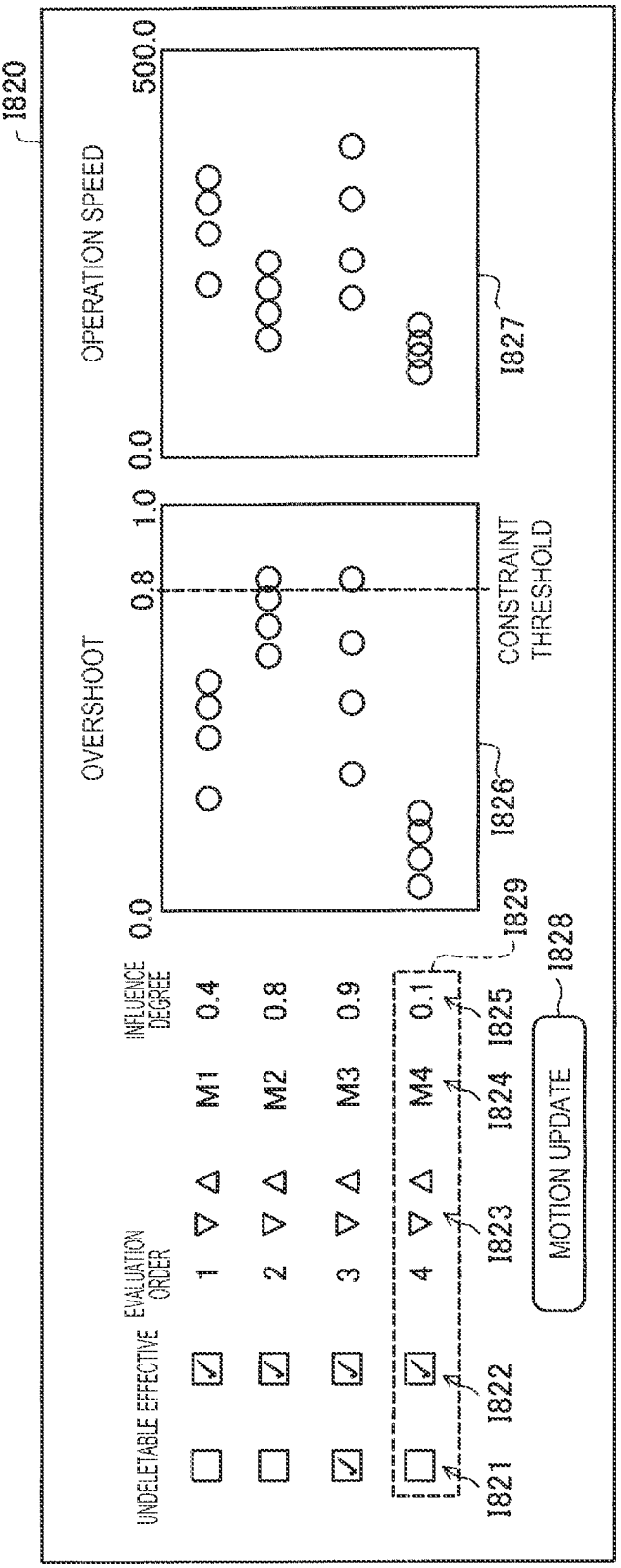
FIG. 6 is a diagram showing a user interface displayed on a display of the setting device in step S800 in FIG. 4.

FIG. 6 is a diagram showing a user interface 1820 displayed on the display 602 of the setting device 600 in step S800 in FIG. 4. In a sixth column from the left end of FIG. 6, display I824 of names M1 to M4 of evaluation motions is shown. In a region I826 in a right part of FIG. 6, detection values of values of overshoots obtained in four times of iterations are indicated by circles respectively about the evaluation motions M1 to M4. In a region I827 in a right part of FIG. 6, detection values of operation speeds obtained in the four times of iterations are indicated by circles respectively about the evaluation motions M1 to M4.

In a column at the left end of FIG. 6, "undeletable" checkboxes I821 for the operator to designate evaluation motions that should not be deleted from targets of step S400 are shown. In an example shown in FIG. 6, the "undeletable" checkbox I821 of the evaluation motion M3 is checked.

In a second column from the left end of FIG. 6, "effective", checkboxes I822 for the operator to designate evaluation motors set as targets of step S400 are shown. In the example shown in FIG. 6, the "effective" checkboxes I822 of the evaluation motions M1 to M4 are checked.

In a third column from the left end of FIG. 6, order of execution in step S400 about the evaluation motions is shown. In a fourth column and a fifth column from the left end of FIG. 6, buttons I823 for raising and lowering the order of execution in step S400 about the evaluation motions are shown.

In a seventh column from the left end of FIG. 6, influence degrees 1825 of the evaluation motions are shown. In this embodiment, the influence degrees of the evaluation motions are predicted values of maximum values of the overshoots in the evaluation motions obtained in step S700.

In a lower left part of FIG. 6, highlighting I829 surrounded by a broken line is shown about the evaluation motion M4 having the influence degree lower than a predetermined influence degree threshold. The highlighting I829 is highlighting for urging the operator to uncheck the "effective" checkbox I822 about the evaluation motion.

It is seen from the display of the region I826 in FIG. 6 that detection values of overshoots exceeding the constraint threshold are present in the evaluation motions M2 and M3. On the other hand, about the evaluation motion M4, it is seen that all of detection values of overshoots obtained in four times of iterations are greatly smaller than the constraint threshold. An influence degree, that is, a predicted value of an overshoot of the evaluation motion M4 is 0.1 (see Expression (4)). That is, in the evaluation motion M4, it is predicted that any candidate values of the force control parameters do not exceed the constraint threshold. Accordingly, it is seen that the evaluation motion M4 hardly affects selection of candidate values of the force control parameters even if detection values are not executed or measured in the detection processing in step S400.

In step S800 in FIG. 4, the operator viewing the user interface 1820 shown in FIG. 6 operates the "undeletable" checkbox I821, the "effective" checkbox I822, and the button I823 for changing the order of execution in step S400.

For example, in the example shown in FIG. 6, about the evaluation motion M4, the "effective" checkbox I822 is unchecked by the operator. The evaluation motion M4 is excluded from the evaluation motions set as the targets of step S400. When the "undeletable" checkbox I821 or the "effective" checkbox I822 is operated by the operator, the processor 610 of the setting device 600 rearranges the evaluation motions, the "effective" checkboxes I822 of which are checked, and the evaluation motions, the "unde-letable" checkboxes I821 of which are checked, in the descending order of the influence degrees.

Figure 7:
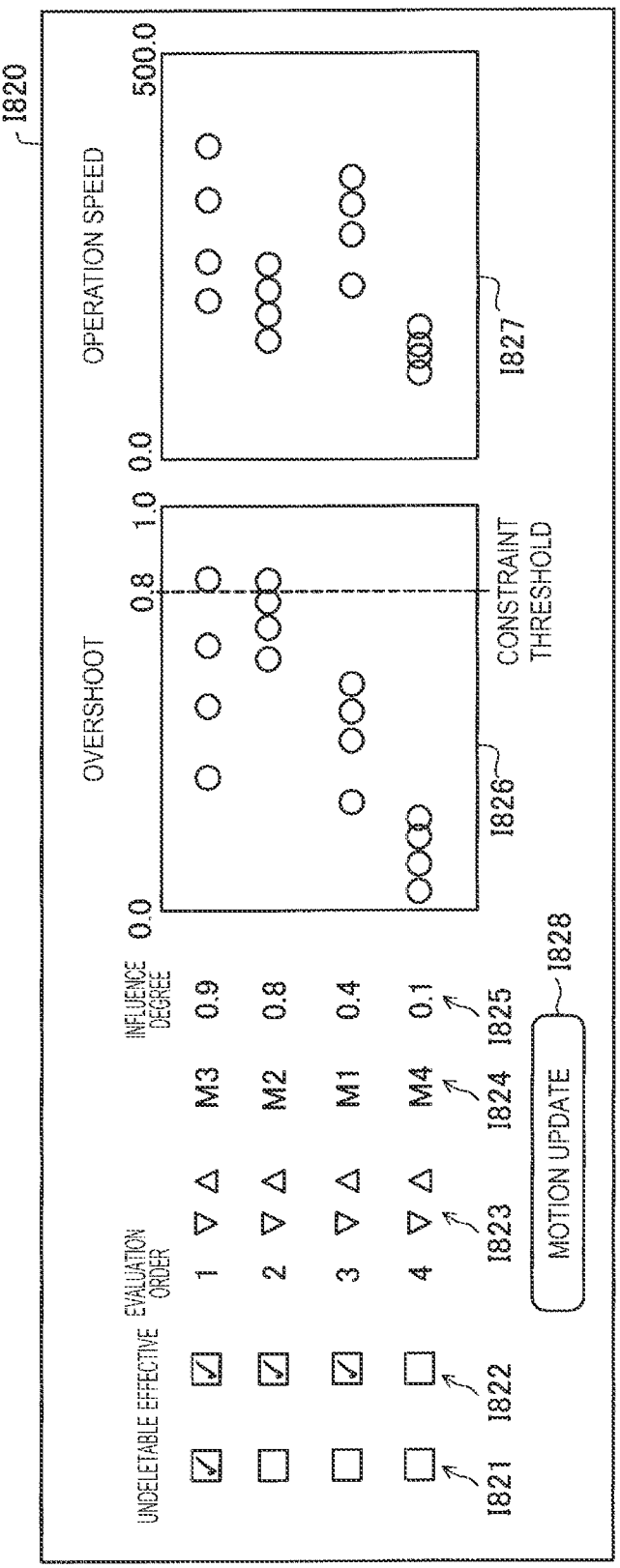
FIG. 7 is a diagram showing the user interface displayed on the display of the setting device after being operated by an operator.

FIG. 7 is a diagram illustrating the user interface 1820 displayed on the display 602 of the setting device 600 after the user interface 1820 is operated by the operator. In an example shown in FIG. 7, the order of execution in step S400 is set to the order of the evaluation motions M3, M2, and M1. When a motion update button 1828 is pressed in this state, the evaluation motions M1 to M3 are decided as the evaluation motions executed in step S400 in FIG. 4. The order of the evaluation motions executed in step S400 is set to the order of the evaluation motions M3, M2, and M1. As a result, in the detection processing in step S400 in FIG. 4 to be executed next, the processor 610 of the setting device 600 causes the robot 100 to execute the plurality of evaluation motions in the descending order of influence degrees.

In a state shown in FIG. 7, the operator can change the evaluation motions and the order of the evaluation motions by operating the "undeletable" checkboxes I821, the "effective" checkboxes I822, and the buttons I823.

When the processing in step S800 is executed first, the processing for changing the execution order is not performed.

In this embodiment, about the evaluation motion M4 having the influence degree lower than the predetermined influence degree threshold, the highlighting I829 surrounded by the broken line is shown to urge the operator to uncheck the "effective" checkbox I822. About the evaluation motion M4, the operator unchecks the "effective" checkbox I822 based on the highlighting I829. As a result, in the detection processing in step S400 in FIG. 4, an evaluation motion having an influence degree smaller than a predetermined reference is not executed by the robot 100. Accordingly, it is possible to reduce a time required for adjustment of the force control parameters.

Figure 11:
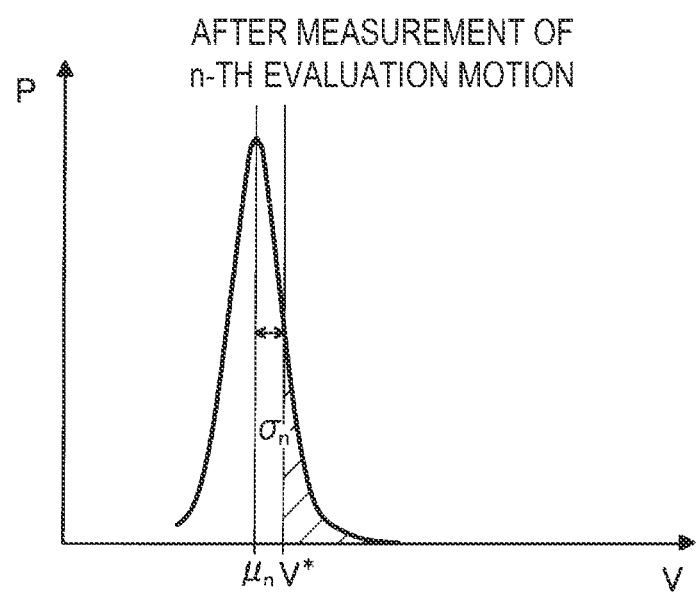
FIG. 11 is a diagram showing a probability that a predicted value of average operation speed of n-th iteration exceeds v*.

As a result of the processing in step S800 in this embodiment, in step S400, an evaluation motion having a higher influence degree is executed earlier (see 1825 in FIG. 11). In this embodiment, the evaluation motion having the higher influence degree is an evaluation motion, an overshoot of which is considered to easily exceed the constraint threshold (see Expression (4)). Accordingly, at an early stage of the repeating processing in steps S410 to S440 in FIG. 5, the suspension determination processing in step S440 for performing continuation and suspension of the detection processing can be executed based on a value of an overshoot of an evaluation motion having a high influence degree. Accordingly, it is highly likely that a processing load in the adjustment of the force control parameters 226 of the robot system can be further reduced.

In this embodiment, in the repeating processing, evaluation motions set as targets are selected and execution order of the evaluation motions is determined based on predicted values of overshoots calculated in the latest processing in step S700 (see S700 and S800 in FIG. 4) Accordingly, it is possible to efficiently determine suspension of the processing in step S440 in FIG. 5.

The force control parameters 226 in this embodiment are referred to as "operation parameters" as well. The force detector 130 is referred to as "detecting section" as well. The operation time and the value of the overshoot are referred to as "detection values" as well. The suspension threshold is referred to as "reference value" as well.

The process of step S300 in FIG. 4 in this embodiment is referred to "operation parameter updating step" as well. The process of step S400 is referred to as "detecting step" as well. The process in which steps S300 and S400 are repeated is referred to as "repeating step" as well. The process of step S1000 is referred to as "operation parameter determining step" as well. The process of step S440 is referred to as "suspension determining step" as well.

B. Second Embodiment

In step S440 in the first embodiment, the suspension of the processing in step S400 in FIG. 4 is determined based on the maximum value of the overshoots, which is the constraint function. In a second embodiment, the suspension of the processing in step S400 is determined using an indicator concerning average operation speed, which is an objective function. However, at a stage when the processing in not all of steps S200 to S900 in FIG. 4 is completed, the indicator concerning the average operation speed used for the determination of the suspension of the processing can be calculated by various methods. Otherwise, the second embodiment is the same as the first embodiment.

B1. First Aspect of the Second Embodiment

In step S440 of a first aspect of the second embodiment, the suspension of the processing in step S400 is determined based on a predicted value of average operation speed in the I-th iteration.

It is assumed that v(i, n) is operation speed of the n-th evaluation motion of the i-th iteration and v*(I, n) is a best value of operation speeds of the n-th evaluation motion up to the I-th iteration. Then, in a state in which measurement of the n-th evaluation motion is completed in the I-th iteration, a predicted value of average operation speed of an evaluation motion in the I-th iteration is calculated by the following Expression (6).

[Math. 6]

$$\hat{v}(I, n) = \frac{1}{N} \{v(I, 1) + v(I, 2) + \ldots + v(I, n) + v*(I-1, n+1) + \ldots + v*(I-1, N)\} \quad (6)$$

The predicted value of the average operation speed of the evaluation motion in the I-th iteration is obtained by combining actual measurement values of first to n-th operation speeds in the I-th iteration and a best value of operation speeds of (n+1)-th and subsequent evaluation motions in first to (I−1)-th iterations.

In the first aspect of the second embodiment, when the following Expression (7) is satisfied in step S440 in FIG. 5, the processing in FIG. 5 is ended. When Expression (7) is not satisfied, the processing returns to step S410. Note that v*(I) is a best value of average operation speeds of evaluation motions up to the I-th iteration.

[Math. 7]

$$\hat{v}(I,n) < v*(I) \times \alpha \quad (7)$$

α is a positive coefficient

In such an aspect, in the adjustment of the force control parameters 226 of the robot system, about a candidate value of a force control parameter, a predicted value of average operation speed for which is found as not being preferable to a certain degree with respect to the best value v*(I) (see Expression (7)), a part of the plurality of evaluation motions is not executed. As a result, compared with an aspect in which all of the evaluation motions are executed about the candidate values of the respective force control parameters, a time required for the adjustment of the force control parameters 226 of the robot system is reduced.

B2. Second Aspect of the Second Embodiment

In step S440 of a second aspect of the second embodiment, the suspension of the processing in step S400 is determined based on a probability that, when (n+1)-th and subsequent unmeasured evaluation motions at a point in time when measurement of the n-th evaluation motion is completed are executed and measured, average operation speed exceeds best operation speed up to that time. In step S800 in the first embodiment, the order of the evaluation motions executed in step S400 is set based on the predicted values of the overshoots serving as the influence degrees (see FIG. 7). In contrast, in step S800 in the second aspect of the second embodiment, the order of the evaluation motions executed in step S400 is set based on a standard deviation of predicted values of operation speeds. Otherwise, the second aspect of the second embodiment is the same as the first embodiment.

It is assumed that operation speed vn of an unmeasured n-th evaluation motion conforms to a normal distribution.

[Math. 8]

$$v_n \sim N(\mu_n, \sigma_n^2) \quad (8)$$

where,

[Math. 9]

$$\mu_n = \frac{1}{I} \sum_{k=1}^{I} v_n(i). \quad (9)$$

[Math. 10]

$$\sigma_n = \sqrt{\frac{1}{I} \sum_{k=1}^{I} (v(i) - \mu_n)^2}. \quad (10)$$

It is assumed that v* is a best value of average operation speeds up to the I-th iteration. It is assumed that a probability that a predicted value of average operation speed of the I-th iteration at a point in time when the measurement of the n-th evaluation motion is completed exceeds v*, that is, Expression (11)

[Math. 11]

$$\hat{v}(i) > V* \quad (11)$$

is satisfied is

[Math. 12]

$$P(\hat{v}(i) > v*) \quad (12)$$

A probability density distribution P of the predicted value of the average operation speed of the I-th iteration at the point in time when the measurement of the n-th evaluation motion is completed

[Math. 13]

$$\hat{v}(i)$$

is represented as follows according to additivity of the normal distribution. The measured first to n-th evaluation motions are treated assuming that average values μ1 to μn are respectively measured values v1 to vn and all standard deviations have a probability density distribution of 0.

[Math. 14]

$$P \sim (\mu_{\hat{v}}, \sigma_{\hat{v}}^2). \quad (14)$$

[Math. 15]

$$\mu_{\hat{v}} = \frac{1}{N}\{v_1 + v_2 + \cdots + v_n + \mu_{n+1} + \cdots + \mu_N\}. \quad (15)$$

[Math. 16]

$$\sigma_{\hat{v}}^2 = \frac{1}{N^2}\{\sigma_{n+1}^2 + \cdots + \sigma_N^2\}. \quad (16)$$

In the second aspect of the second embodiment, when the probability that the predicted value of the average operation speed of the I-th iteration at the point in time when the measurement of the n-th evaluation motion is completed exceeds the best value v* up to that time (see Expression (12) described above) is smaller than the predetermined suspension threshold in step S440 in FIG. 5, the processing in FIG. 5 is ended. When the probability that the predicted value of the average operation speed of the I-th iteration at the point in time when the measurement of the n-th evaluation motion is completed exceeds v* (see Expression (12) described above) is equal to or larger than the suspension threshold, the processing returns to step S410.

Figure 8:
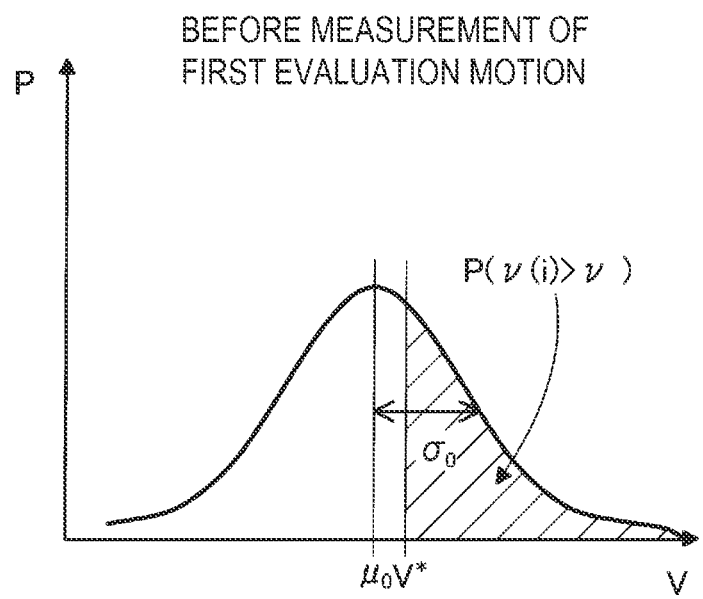
FIG. 8 is a diagram showing a probability that a predicted value of average operation speed of iteration exceeds v* at a point in time before measurement of a first evaluation motion.
Figure 9:
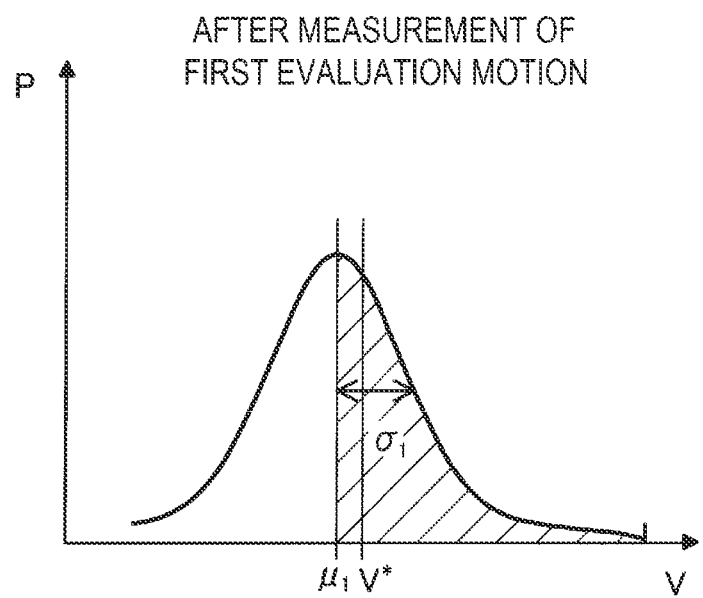
FIG. 9 is a diagram showing a probability that a predicted value of average operation speed of first iteration exceeds v*.
Figure 10:
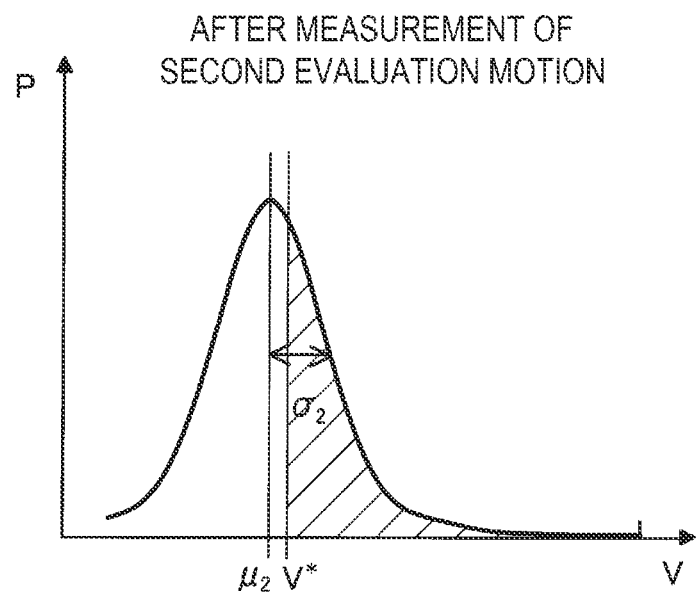
FIG. 10 is a diagram showing a probability that a predicted value of average operation speed of second iteration exceeds v*.
Figure 12:
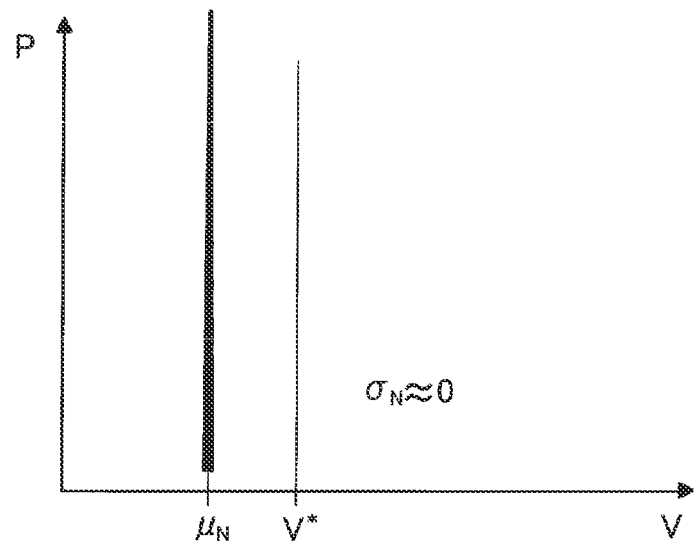
FIG. 12 is a diagram showing a probability that a predicted value of average operation speed of I-th iteration exceeds v*.

FIGS. 8 to 12 are diagrams showing a probability that the predicted value v of the average operation speed of the I-th iteration exceeds v* (see Expression (12) described above). A graph shown in FIG. 8 shows a probability density distribution of the predicted value v of the average operation speed of the I-th iteration at a point in time before measurement of the I-th evaluation motion. A graph shown in FIG. 9 shows a probability density distribution of the predicted value v of the average operation speed of the I-th iteration at a point in time after measurement of the I-th evaluation motion. A graph shown in FIG. 10 shows a probability density distribution of the predicted value v of the average operation speed of the I-th iteration at a point in time after measurement of the second evaluation motion. A graph shown in FIG. 11 shows a probability density distribution of the predicted value v of the average operation speed of the I-th iteration at a point in time after measurement of the n-th evaluation motion. A graph shown in FIG. 12 shows a probability density distribution of the predicted value v of the average operation speed of the I-th iteration at a point in time after measurement of all the evaluation motions set as the targets. The respective probability density distributions are assumed to be normal distributions. In FIGS. 8 to 12, average values of the probability density distributions are indicated by µ0, µ1, µ2, µn, and µN. Standard deviations of the probability density distributions are indicated by σ0, σ1, σ2, σn, and σN.

In FIGS. 8 to 12, the area of a region indicated by hatching indicates the probability that the predicted value v of the average operation speed of the I-th iteration exceeds v* (see Expression (12) described above). As the measurement of the evaluation motions advances, since uncertain elements decrease, the standard deviation of the probability density distribution approaches 0 and the probability density distribution narrows.

In the second aspect of the second embodiment, the order of the evaluation motions executed in step S400 is set such that the order is earlier as dispersion of the predicted value v of the operation speed (see Expression (16) described above) is larger in step S800 in FIG. 4.

By performing such processing, it can be expected that the dispersion of the predicted value v of the operation speed (see Expression (16) described above), in other words, uncertainty can be reduced at an early stage of the repeating processing in steps S200 to S800. As a result, it is possible to more accurately perform the determination of the suspension in step S440 in FIG. 5 at an early stage of the repeating processing in steps S200 to S800.

B3. Third Aspect of the Second Embodiment

In a third aspect of the second embodiment, processing in which the processing in steps S410 to S420 in FIG. 5 is performed in order is repeated R times (R is an integer equal to or larger than 2). Accordingly, the end condition in step S430 and the suspension determination condition in step S440 are different from those in the second aspect of the second embodiment. Otherwise, the third aspect of the second embodiment is the same as the second aspect of the second embodiment. This aspect is applied when a value of an objective function easily varies, for example, when force control is performed.

In step S430 in FIG. 5, the processor 610 of the setting device 600 determines whether each of the processing in step S410 and the processing in step S420 is executed R times about all of the evaluation motions decided in immediately preceding step S800. R is specifically three. When each of the processing in step S410 and the processing in step S420 is executed R times about all of the evaluation motions, the processing in FIG. 5 ends. When each of the processing in step S410 and the processing in step S420 executed R times is not completed about all of the evaluation motions, the processing proceeds to step S440.

In step S440 in FIG. 5, about all of the evaluation motions set as targets at that point in time, continuation or suspension of the processing in FIG. 5 is determined based on an improvement probability, which is a probability at a point in time when j-th (j is an integer equal to or larger than 1 and smaller than R) is completed that, when (j+1)-th to R-th execution and measurement of the evaluation motions are performed, average operation speed exceeds the best operation speed up to that time.

Figure 13:
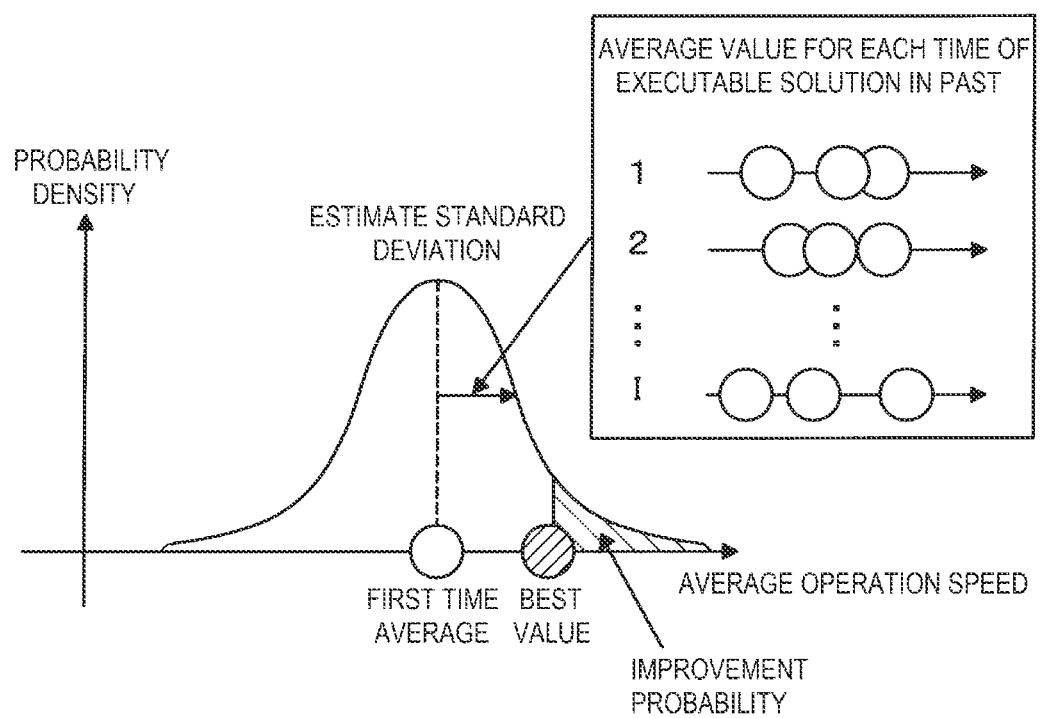
FIG. 13 is a diagram showing an improvement probability at a point in time when third measurement is completed that, when execution and measurement of fourth to seventh evaluation motions are performed, average operation speed exceeds best operation speed up to that time.

FIG. 13 is a diagram showing the improvement probability at a point in time when the first measurement in step S420 is completed in (I+1)-th iteration that, when second to third execution and measurement of the evaluation motions are performed, the average operation speed exceeds the best operation speed up to that time. A graph shown in FIG. 13 is a probability density distribution of average operation speed in the case in which the second to third execution and measurement of the evaluation motions are performed at the point in time when the first measurement is completed. The probability density distribution is assumed to be a normal distribution. In the probability density distribution, an average is assumed to be first average operation speed. A standard deviation is assumed to be an average value of standard deviations of respective operation speeds in the first to I-th iterations. Operation speeds in first processing to third processing about the first to I-th iterations are indicated by circles in a square shown in an upper right part of FIG. 13. Rightward arrows in the square shown in the upper right part of FIG. 13 are evaluation axes of the operation speeds. In FIG. 13, the area of a region indicated by hatching indicates the improvement probability at the point in time when the first measurement is completed that, when the second to third execution and measurement of the evaluation motions are performed, the average operation speed exceeds the best operation speed up to that time.

When iteration in which an overshoot and operation speed are not detected is included in the first to I-th iterations, the iteration is excluded from targets in the calculation of the standard deviations and the averages.

When the improvement probability is smaller than the predetermined suspension threshold in step S440 in FIG. 5, the processing in FIG. 5 is ended. Otherwise, the processing returns to step S410.

In such an aspect, in the adjustment of the force control parameters 226 of the robot system, a part of the R times of the repeating processing is not executed about a candidate value of a force control parameter for which a probability that average operation speed exceeds the best operation speed up to that time is found as being lower than the suspension probability. As a result, compared with an aspect in which R times of processing is executed about the candidate values of the respective force control parameters, a time required for the adjustment of the force control parameters 226 of the robot system is reduced.

C. Third Embodiment

In a third embodiment, a calculation method for predicted values in step S700 in FIG. 4 is different from the calculation method in the first embodiment. Otherwise, the third embodiment is the same as the first embodiment.

In step S700 in the third embodiment, the processor 610 of the setting device 600 calculates predicted values of overshoots about a plurality of evaluation motions based on overshoots obtained in nearest m times (m is an integer equal to or larger than 2) of detection processing among overshoots obtained in the detection processing in step S400 up to that time. In a state in which the I-th iteration is completed, a predicted value $c_{os}(n)$ of an overshoot of the n-th evaluation motion is calculated as follows.

When OS(i, n) is assumed to be the overshoot of the n-th evaluation motion of the i-th iteration, an average value $\mu_{os}(n)$ of overshoots of the n-th evaluation motion of (I−m+1)-th iteration to the I-th iteration is obtained by Expression (17).

[Math. 17]

$$\mu_{OS}(n) = \frac{1}{m}\sum_{k=I-m+1}^{I} OS(i, n). \quad (17)$$

A standard deviation $\sigma_{os}$ (n) of the overshoots of the n-th evaluation motion of the (I−m+1)-th iteration to the I-th iteration is obtained by Expression (18).

[Math. 18]

$$\sigma_{OS}(n) = \sqrt{\frac{1}{m}\sum_{k=I-m+1}^{I}(OS(i, n) - \mu_{OS}(n))^2}. \quad (18)$$

As a result, in a state in which the I-th iteration is completed, the predicted value $c_{os}$ (n) of the overshoot of the n-th evaluation motion can be calculated by the following Expression (19).

[Math. 19]

$$c_{os}(n) = \mu_{os}(n) \pm k\sigma_{os}(n) \quad (19)$$

k is a coefficient

In this embodiment, $c_{os}(n)$ is a predicted value of an overshoot and is a value, the smaller it is, the higher the evaluation. Accordingly, in the state in which the I-the iteration is completed, as the predicted value $c_{os}$ (n) of the overshoot of the n-th evaluation motion, an expression adopting + of ± of the right side in Expression (19) is adopted.

When $c_{os}$ (n) is a value, the larger it is, the higher the evaluation, in the state in which the I-th iteration is completed, as the predicted value $c_{os}$ (n) of the overshoot of the n-th evaluation motion, an expression adopting − of ± of the right side in Expression (19) is adopted.

When iteration in which an overshoot is not detected about an evaluation motion for which overshoots are detected in the other iterations is included in the first to I-th iterations, the iteration is excluded from targets in the calculation of Expressions (17) to (19) described above.

In the third embodiment, a predicted value of an overshoot serving as an influence degree is calculated based on overshoots of nearest m times of detection processing by the method explained above. Even in such an aspect, the selection and the rearrangement of the evaluation motions are appropriately performed in step S800. As a result, it is possible to reduce a time required for adjustment of the force control parameters.

D. Other Embodiments

D1. Another Embodiment 1

(1) In the first embodiment, the predicted value of the overshoot is calculated as the influence degree in step S700 in FIG. 4 (see Expression (4) described above). However, the influence degree may be calculated by another method. For example, the influence degree may be calculated according to Expression (20) described below based on a weighted sum of an average value of overshoots and a standard deviation of average speed.

[Math. 20]

$$cv_{os}(n) = k_1\mu_{os}(n) + k_2\sigma_v(n) \quad (20)$$

$\sigma_v(n)$: a standard deviation of average speed
$\mu_{os}(n)$: an average value of overshoots
$k_1, k_2$: coefficients In step S800 in FIG. 4, the evaluation motions, the "effective" checkboxes of which are checked, and the evaluation motions, the "undeletable" checkboxes of which are checked, are rearranged in the descending order of values obtained by Expression (20) described above (see M1 to M3 in FIG. 11).

In such an aspect, an evaluation motion having a high influence degree is an evaluation motion, an overshoot of which is considered to easily exceed the constraint threshold, (see Expression (4)) and is an evaluation motion having high uncertainty of a predicted value of operation speed. Even in such an aspect, the suspension determination processing in step S440 for performing the continuation or the suspension of the detection processing can be executed at an early stage of the repeating processing in steps S410 to S440 in FIG. 5 based on a value of an overshoot of an evaluation motion having a high influence degree. Accordingly, it is highly likely that the processing load in the adjustment of the force control parameters 226 of the robot system can be further reduced.

The suspension determination processing in step S440 in FIG. 5 may be performed based on comparison of the value obtained by Expression (20) described above and a threshold.

(2) In the first embodiment, one predicted value is calculated for one evaluation motion in step S700 in FIG. 4 (see Expression (4) described above). However, when one evaluation motion is configured from a plurality of motions, a predicted value may be calculated for each of the plurality of motions configuring the one evaluation motion and the processing in step S800 may be performed based on predicted values of the plurality of evaluation motions.

(3) In the first embodiment, the suspension of the processing in step S400 is determined based on the maximum value of the overshoots, which is the constraint function (see S440 in FIG. 5). In the second embodiment, the suspension of the processing in step S400 is determined based on the average value of the operation speeds, which is the objective function (see Expression (6)). However, the determination of the suspension of the detection processing can be performed based on various indicators.

FIG. 14 is a table showing an example of indicators at the time when the influence degree, that is, the execution order of the evaluation motions is determined in the processing in S800 in FIG. 4 (see 1825 in FIG. 7). The indicator at the time when the execution order of the evaluation motions is determined can be a maximum value or a minimum value of values derived from the detection value in step S400 (see an A field and a B field of FIG. 14). The indicator at the time when the execution order of the evaluation motions is determined can be an average of values derived from the detection value in step S400 (see a C field and a D field in a lower part of FIG. 14). The indicator at the time when the execution order of the evaluation motions is determined may coincide with the objective function (see the A field and the C field of FIG. 14). The indicator at the time when the execution order of the evaluation motions is determined may coincide with the constraint function (see the B field and the D field of FIG. 14). The first embodiment is equivalent to a mode of the B field. The second embodiment is equivalent to a mode of the C field.

FIG. 15 is a table showing an amount considered important when the execution order of the evaluation motions is determined in the processing in S800 in FIG. 4 in the four modes shown in FIG. 14. In the aspect in which the maximum value or the minimum value of the values derived from the detection value is estimated from detection values obtained up to that time, an average value and a standard deviation are used to calculate those values (see Expressions (3) to (5) and Expression (19) described above) Accordingly, when the maximum value or the minimum value of the values derived from the detection value is adopted as the indicator, both of an average value $\mu$ and a standard deviation $\sigma$ of the detection values obtained up to that time are considered important when the execution order of the evaluation motion is determined (see an upper part of FIG. 14 and an upper part of FIG. 15).

Possibility that the average value of the values derived from the detection value fluctuates according to the following measurement result appears in the standard deviation of the values derived from the detection values obtained up to that time. Accordingly, when the average value of the values derived from the detection value is adopted as the indicator, the standard deviation $\sigma$ of the values derived from the detection values obtained up to that time is considered important when the execution order of the evaluation motions is determined.

FIG. 16 is a table showing references compared with the indicators in the four modes shown in FIG. 14. When the indicator at the time when the execution order of the evaluation motions is a maximum value, a minimum value, or an average value of the objective function (see a left part of FIG. 14), the reference compared with the indicator is preferably a best value in the past. When the indicator at the time when the execution order of the evaluation motion is determined is a maximum value, a minimum value, or an average value of the constraint function (see a right part of FIG. 14), the reference compared with the indicator is preferably the constraint threshold.

(4) In the embodiments explained above, the robot 100 is a vertically articulated six-axis robot including the six joints J1 to J6 (see FIG. 1). However, an application target of the technique of the present disclosure may be a robot including another joint mechanism such as a horizontally articulated type or an orthogonal coordinate type.

(5) In the embodiments explained above, the force detector 130 is provided in the arm flange 120 present at the distal end of the arm 110 (see FIG. 1). However, a force detector may be provided in another part such as a joint other than a joint located closest to the distal end side in a robot arm or a base of the robot arm.

(6) In the embodiments explained above, the force detector 130 can detect the magnitudes of the forces parallel to the three detection axes, that is, the x axis, the y axis, and the z axis orthogonal to one another in the sensor coordinate system, which is the specific coordinate system, and the magnitudes of the torques around the three detection axes (see FIG. 1). However, a force detector may detect only a force in a force controlling direction and only torque around an axis in the direction. It is also possible to adopt an aspect in which the force detector detects the torque of a joint of a robot, for example, based on a measurement value of an electric current of a servomotor rather than directly detecting a force and torque. That is, the force detector only has to be able to detect a force and torque in a direction for controlling a control point.

(7) In the embodiments explained above, the adjustment of the force control parameters is performed by the setting device 600 connected to the robot control device 200 by radio or wire (see FIG. 2). However, the adjustment of the force control parameters may be performed by the robot control device 200 that causes the robot 100 to perform operation according to feedback control.

(8) In the third embodiment explained above, the processing in steps S300 to S800 in FIG. 4 is executed three times at most. However, the number of times of the execution and the measurement of the evaluation motions using candidates of operation parameters may be any number of times such as once, twice, eight times, or ten times.

(9) In the embodiments explained above, the optimization processing using the CMA-ES is performed in step S300 (see FIGS. 4 and 7). However, the optimization processing may be performed by another method such as Bayesian optimization, a grid search, a random search, or a Nelder-Mead method.

(10) In the embodiments, the overshoot amount and the average operation speed are adopted as the indicator used for the determination in step S440 in FIG. 5. However, the indicator used for the determination of the processing end condition can also be other indicators such as values obtained based on an operation time and a force measurement value.

(11) In step S500 in the first embodiment explained above, the penalty is calculated by multiplying the number of unexecuted evaluation motions among the N evaluation motions by the predetermined coefficient in the detection processing in step S400. However, the penalty may be calculated by another method. For example, the penalty may be calculated by multiplying a difference between an overshoot amount exceeding the constraint threshold and the constraint threshold by a predetermined coefficient in the detection processing in step S400.

(12) In step S600 in the first embodiment explained above, the objective function is the average operation speed and the evaluation value is calculated as follows.

[Evaluation value]=[average operation speed]-[penalty]

However, when the objective function is a function that is preferably small such as an operation time, the penalty is preferably added.

(13) In the processing in step S800 in the first embodiment explained above, the highlighting I829 surrounded by the broken line is shown about the evaluation motion M4 having the influence degree lower than the predetermined influence degree threshold (see FIG. 6). About the evaluation motion M4, the "effective" checkbox is unchecked by the operator. The evaluation motion M4 is excluded from the evaluation motions set as the targets of step S400. Thereafter, the processor 610 of the setting device 600 rearranges the evaluation motions, the "effective" checkboxes of which are checked, and the evaluation motions, the "undeletable" checkboxes of which are checked, in the descending order of the influence degrees (see FIG. 7).

However, processing for excluding, from targets, an evaluation motion having an influence degree lower than the predetermined influence degree threshold may be automatically performed by the processor of the setting device. The rearrangement of the execution order of the evaluation motions may be automatically performed by the processor of the setting device not through operation by the operator.

D2. Another Embodiment 2

In the embodiments explained above, in step S500 in FIG. 4, the penalty is calculated about the candidate values of the set of force control parameters, which are the evaluation targets. In step S600, the evaluation values are calculated about the candidate values of the set of force control parameters, which are the evaluation targets, using the objective function and the penalty. However, it is also possible to adopt an aspect in which a penalty is not calculated for a candidate value of a force control parameter for which an unexecuted evaluation motion is present and when the force control parameters are determined in step ′1000, the candidate value is excluded from candidates.

D3. Another Embodiment 3

In the first embodiment explained above, in step S700 in FIG. 4, the predicted value of the overshoot is calculated as the influence degree. In the processing in step S800, the order of execution of the plurality of evaluation motions executed in step S400 is determined (see FIGS. 6 and 7). However, it is also possible to adopt an aspect in which the calculation of the influence degree and the determination of the order of the execution of the evaluation motions based on the influence degree are not performed and the plurality of evaluation motions are not executed based on the influence degree in the detection processing.

D4. Another Embodiment 4

In the first embodiment explained above, in the detection processing in step S400 in FIG. 4 executed next, the processor 610 of the setting device 600 causes the robot 100 to execute the plurality of evaluation motions in the descending order of the influence degrees. However, in the detection processing, the plurality of evaluation motions may be executed in order determined based on another factor or predetermined order.

D5. Another Embodiment 5

In the first embodiment explained above, as a result of the processing in step S800 in FIG. 4, in the detection processing in step S400, the evaluation motion having the influence degree smaller than the predetermined reference is not executed by the robot 100 (see FIG. 7). However, in the detection processing in step S400, the evaluation motion having the influence degree smaller than the predetermined reference may be executed by the robot 100, for example, according to designation by the operator.

D6. Another Embodiment 6

In the first embodiment explained above, the force control parameters are used as an example of the operation parameters. However, not only this, but position control parameters may be used as the operation parameters.

As the detecting section that detects vibration of the robot 100, an acceleration sensor or a current sensor that detects an electric current of a motor may be used rather than the force detecting section 130. When the acceleration sensor is used, vibration of the robot 100 is calculated from detected acceleration. When the current sensor is used, motor torque is calculated from a detected motor current and vibration of the robot 100 is calculated from the calculated motor torque.

E. Other Aspects

The present disclosure is not limited to the embodiments, the examples, and the modifications explained above and can be realized in various configurations without departing from the gist of the present disclosure. For example, the technical features in the embodiments, the examples, and the modifications corresponding to the technical features in the aspects described in the summary can be substituted or combined as appropriate in order to solve a part or all of the problems described above or achieve a part or all of the effects described above. Unless the technical features are explained as essential technical features in this specification, the technical features can be deleted as appropriate.

(1) According to an aspect of the present disclosure, there is provided an operation parameter adjusting method for adjusting operation parameters of a robot system including a robot and a detecting section configured to detect vibration of the robot. The operation parameter adjusting method includes: a detecting step for causing the robot to execute a plurality of adjustment operations using candidate values of the operation parameters and acquiring detection values of the detecting section; an operation parameter updating step for executing optimization processing for the operation parameters using the acquired detection values to thereby obtain new candidate values of the operation parameters; a repeating step for repeating the operation parameter updating step and the detecting step performed using the new candidate values obtained in the operation parameter updating step; and an operation parameter determining step for determining, based on one or more candidate values of the operation parameters obtained by the repeating step, the operation parameter used in the robot system. The detecting step includes a suspension determining step for, in a state in which the detection values are acquired for a part of the plurality of adjustment operations, performing continuation or suspension of the detecting step based on a result of comparison of the acquired detection values of the part of the adjustment operations and a reference value.

In such an aspect, in the adjustment of the operation parameters of the robot system, a part of the plurality of adjustment operations is not executed about the candidate value of the operation parameter, the detection value of which acquired during the detecting step is found as exceeding a certain degree with respect to the reference value and unpreferable. As a result, compared with an aspect in which all of the adjustment operations are executed about the candidate values of the respective operation parameters, a time required for the adjustment of the operation parameters of the robot system is reduced.

(2) In the adjusting method according to the aspect, the operation parameter determining step may be a step of determining, based on the evaluation value about each of the one or more candidate values of the operation parameters, the operation parameter used in the robot system, and the operation parameter adjusting method may further include a penalty step for adding a penalty to the evaluation value of the candidate value of the operation parameter for which the suspension of the detecting step was performed in the suspension determining step.

In such an aspect, the candidate value of the operation parameter, the detection value of which acquired in the detecting step is found as exceeding the certain degree and unpreferable, can be less easily determined as the operation parameter used in the robot system in the operation parameter determining step.

(3) In the adjusting method according to the aspect, the operation parameter determining step may be a step of determining, based on the evaluation value about each of the one or more candidate values of the operation parameters, the operation parameter used in the robot system, the repeating step may be a step of repeatedly executing, based on the detection values obtained up to that time, about one or more of the plurality of adjustment operations, an influence degree determining step for determining influence degrees on the evaluation values together with the operation parameter updating step and the detecting step, and the detecting step may be executed based on the influence degrees.

In such an aspect, the detecting step is executed based on the influence degrees of the adjustment operations. Accordingly, it is possible to perform the detecting step and the determination of the suspension of the detecting step considering the influence on the determination of the operation parameters.

(4) In the adjusting method according to the aspect, the detecting step may be a step of causing the robot to execute the plurality of adjustment operations in descending order of the influence degrees.

In such an aspect, the adjustment operation having a higher influence degree is executed earlier. Accordingly, it is possible to execute, based on the detection value of the adjustment operation having a high influence degree, at an early stage, the suspension determining step for performing the continuation of the detecting step or a shift to the operation parameter updating step. Accordingly, it is highly likely that a processing load in the adjustment of the operation parameters of the robot system can be further reduced.

(5) In the adjusting method according to the aspect, the detecting step may be a step of not causing the robot to execute the adjustment operation having the influence degree smaller than a predetermined reference.

In such an aspect, the adjustment operation having a low influence degree is not executed. Accordingly, it is possible to reduce a time required for the adjustment of the operation parameters of the robot system while suppressing influence on the determination of the operation parameters in the operation parameter determining step.

(6) According to another aspect of the present disclosure, there is provided an operation parameter adjusting device that adjusts operation parameters of a robot system including a robot and a detecting section configured to detect vibration of the robot. The operation parameter adjusting device includes: a detection processing section configured to perform detection processing for causing the robot to execute a plurality of adjustment operations using candidate values of the operation parameters and acquiring detection values of the detecting section; a parameter updating section configured to perform operation parameter update processing for executing optimization processing for the operation parameters using the acquired detection values to thereby obtain new candidate values of the operation parameters; a repeating processing section configured to perform repeating processing for repeating the operation parameter update processing and the detection processing performed using the new candidate values obtained in the operation parameter updating processing; and a parameter determining section configured to perform operation parameter determination processing for determining, based on one or more candidate values of the operation parameters obtained by the repeating processing, the operation parameter used in the robot system. The detection processing section executes suspension determination processing for, in a state in which the detection values are acquired for a part of the plurality of adjustment operations, performing continuation or suspension of the detection processing based on a result of comparison of the acquired detection values of the part of the adjustment operations and a reference value.

(7) In the adjusting device according to the aspect, the operation parameter determination processing may be processing for determining, based on the evaluation value about each of the one or more candidate values of the operation parameters, the operation parameter used in the robot system, and the operation parameter adjusting device may further include a penalty section configured to perform penalty processing for adding a penalty to the evaluation value of the candidate value of the operation parameter for which the suspension of the detection processing was performed in the suspension determination processing.

(8) In the adjusting device according to the aspect, the operation parameter determination processing may be processing for determining, based on the evaluation value about each of the one or more candidate values of the operation parameters, the operation parameter used in the robot system, the repeating processing may be processing for repeatedly executing, based on the detection values obtained up to that time, about one or more of the plurality of adjustment operations, influence degree determination processing for determining influence degrees on the evaluation values together with the operation parameter update processing and the detection processing, and the detection processing may be executed based on the influence degrees.

(9) In the adjusting device according to the aspect, the detection processing may be processing for causing the robot to execute the plurality of adjustment operations in descending order of the influence degrees.

(10) In the adjusting device according to the aspect, the detection processing may be processing for not causing the robot to execute the adjustment operation having the influence degree smaller than a predetermined reference.

The present disclosure can also be realized in various aspects other than the force control parameter adjusting method and the force control parameter adjusting device. For example, the present disclosure can be realized in aspects such as a robot setting method and a robot control method, a computer program for realizing these methods, and a non-transitory recording medium recording the computer program.

What is claimed is:

1. An operation parameter adjusting method for adjusting operation parameters of a robot system including a robot and a detecting section configured to detect vibration of the robot, the operation parameter adjusting method comprising:
    a detecting step for causing the robot to execute a plurality of adjustment operations using candidate values of the operation parameters and acquiring detection values of the detecting section;
    an operation parameter updating step for executing optimization processing for the operation parameters using the acquired detection values to thereby obtain new candidate values of the operation parameters;
    a repeating step for repeating the operation parameter updating step and the detecting step performed using the new candidate values obtained in the operation parameter updating step; and
    an operation parameter determining step for determining, based on one or more candidate values of the operation parameters obtained by the repeating step, the operation parameter used in the robot system, wherein
    the detecting step includes a suspension determining step for, in a state in which the detection values are acquired for a part of the plurality of adjustment operations, performing continuation or suspension of the detecting step based on a result of comparison of the acquired detection values of the part of the adjustment operations and a reference value.

2. The operation parameter adjusting method according to claim 1, wherein
    the operation parameter determining step is a step of determining, based on the evaluation value about each of the one or more candidate values of the operation parameters, the operation parameter used in the robot system, and
    the operation parameter adjusting method further comprises a penalty step for adding a penalty to the evaluation value of the candidate value of the operation parameter for which the suspension of the detecting step is performed in the suspension determining step.

3. The operation parameter adjusting method according to claim 1, wherein
    the operation parameter determining step is a step of determining, based on the evaluation value about each of the one or more candidate values of the operation parameters, the operation parameter used in the robot system,
    the repeating step is a step of repeatedly executing, based on the detection values obtained up to that time, about one or more of the plurality of adjustment operations, an influence degree determining step for determining influence degrees on the evaluation values together with the operation parameter updating step and the detecting step, and
    the detecting step is executed based on the influence degrees.

4. The operation parameter adjusting method according to claim 3, wherein the detecting step is a step of causing the robot to execute the plurality of adjustment operations in descending order of the influence degrees.

5. The operation parameter adjusting method according to claim 3, wherein the detecting step is a step of not causing the robot to execute the adjustment operation having the influence degree smaller than a predetermined reference.

6. An operation parameter adjusting device that adjusts operation parameters of a robot system including a robot and a detecting section configured to detect vibration of the robot, the operation parameter adjusting device comprising:
    a detection processing section configured to perform detection processing for causing the robot to execute a plurality of adjustment operations using candidate values of the operation parameters and acquiring detection values of the detecting section;
    a parameter updating section configured to perform operation parameter update processing for executing optimization processing for the operation parameters using the acquired detection values to thereby obtain new candidate values of the operation parameters;
    a repeating processing section configured to perform repeating processing for repeating the operation parameter update processing and the detection processing performed using the new candidate values obtained in the operation parameter updating processing; and
    a parameter determining section configured to perform operation parameter determination processing for determining, based on one or more candidate values of the operation parameters obtained by the repeating processing, the operation parameter used in the robot system, wherein
    the detection processing section executes suspension determination processing for, in a state in which the detection values are acquired for a part of the plurality of adjustment operations, performing continuation or suspension of the detection processing based on a result of comparison of the acquired detection values of the part of the adjustment operations and a reference value.

7. The operation parameter adjusting device according to claim 6, wherein
    the operation parameter determination processing is processing for determining, based on the evaluation value about each of the one or more candidate values of the operation parameters, the operation parameter used in the robot system, and
    the operation parameter adjusting device further comprises a penalty section configured to perform penalty processing for adding a penalty to the evaluation value of the candidate value of the operation parameter for which the suspension of the detection processing is performed in the suspension determination processing.

8. The operation parameter adjusting device according to claim 6, wherein
    the operation parameter determination processing is processing for determining, based on the evaluation value about each of the one or more candidate values of the operation parameters, the operation parameter used in the robot system, the repeating processing is processing for repeatedly executing, based on the detection values obtained up to that time, about one or more of the plurality of adjustment operations, influence degree determination processing for determining influence degrees on the evaluation values together with the operation parameter update processing and the detection processing, and the detection processing is executed based on the influence degrees.

9. The operation parameter adjusting device according to claim 8, wherein the detection processing is processing for causing the robot to execute the plurality of adjustment operations in descending order of the influence degrees.

10. The operation parameter adjusting device according to claim 8, wherein the detection processing is processing for not causing the robot to execute the adjustment operation having the influence degree smaller than a predetermined reference.

* * * * *